United States Patent [19]
Pitton

[11] Patent Number: 5,292,412
[45] Date of Patent: Mar. 8, 1994

[54] REMOVAL OF MERCURY FROM WASTE STREAMS

[75] Inventor: Oscar A. Pitton, Geneva, Switzerland

[73] Assignee: ELTECH Systems Corporation, Boca Raton, Fla.

[21] Appl. No.: 683,010

[22] Filed: Apr. 10, 1991

[30] Foreign Application Priority Data

Apr. 12, 1990 [EP] European Pat. Off. ........ 90810297.3

[51] Int. Cl.⁵ .............................................. C02F 1/461
[52] U.S. Cl. .................... 204/149; 204/269; 204/272; 204/275; 204/276; 204/152; 204/141.5
[58] Field of Search ............... 204/149, 151, 152, 140, 204/141.5, 275, 276, 272, 257, 260, 263, 264, 269

[56] References Cited

U.S. PATENT DOCUMENTS

| | | |
|---|---|---|
| 3,639,118 | 2/1972 | O'Grady ........................... 204/140 |
| 3,764,499 | 10/1973 | Okubo et al. ...................... 204/151 |
| 3,899,405 | 8/1975 | Iverson et al. ..................... 204/149 |
| 3,970,531 | 7/1976 | Recht ................................. 204/149 |
| 4,028,236 | 6/1977 | Townsend et al. ................ 210/45 |
| 4,226,685 | 10/1980 | Portal et al. ..................... 204/105 R |
| 4,276,147 | 6/1981 | Epner et al. ....................... 204/272 |
| 4,436,601 | 3/1984 | Branchick et al. ................ 204/149 |
| 4,643,819 | 2/1987 | Heroguelle ....................... 204/269 |
| 4,859,295 | 8/1989 | Dietz et al. ...................... 204/105 R |

FOREIGN PATENT DOCUMENTS

| | | |
|---|---|---|
| 0071443 | 7/1982 | European Pat. Off. . |
| 2582321 | 5/1985 | France . |
| 1091699 | 9/1967 | United Kingdom . |
| 1312681 | 3/1970 | United Kingdom . |
| 1578811 | 11/1980 | United Kingdom . |

Primary Examiner—John Niebling
Assistant Examiner—Arun S. Phasge
Attorney, Agent, or Firm—John J. Freer

[57] ABSTRACT

A waste stream contaminated with mercury is purified by flowing the stream cyclically and/or sequentially through at least one electrolytic cell provided with an anode (11) and a cathode (10) made of tin, copper, silver or alloys thereof and optionally comprising other alloying element(s). The cathode (10) is a microporous, high surface area body through which the electrolyte can pass, with the solution sweeping the microporous surfaces. After cycling through one cell or cell module (1) with cathodes of given microporosity, the solution is passed to the next cell or cell module with cathodes of finer miocroporosity. The microporous surfaces are periodically cleaned by counter-current flushing, preferably followed by a rest period. The waste stream may be an acidic waste stream containing organic mercury compounds.

33 Claims, 2 Drawing Sheets

REMOVAL OF MERCURY FROM WASTE STREAMS

FIELD OF THE INVENTION

The invention relates to methods and installations for purifying waste streams contaminated with mercury and is concerned both with the purification of large waste streams from industrial processes, for example those derived from flue gases for instance from organic synthesis processes where mercury is present in organic complexes, and the outlet streams of flowing mercury cathode chlor-alkali cells, waste streams from mercury-contaminated soil, as well as smaller waste streams, for example mercury-contaminated waste waters from dentist's installations.

BACKGROUND OF THE INVENTION

U.S. Pat. No. 4,028,236 discloses a method of removing mercury from caustic effluent streams using tin-coated iron strips on which metallic mercury accumulates and is removed. Low mercury levels in the solution were reported for quite long treatment times.

DE - A - 3'721'141 proposes to remove mercury from flue-scrubber wash water using tin chloride as reducing agent to bring the mercury level to about 0.1 mg/l.

DE - A - 2,610,826 discloses a wet scrubber system using a tin or zinc grid to remove mercury from off gases.

DE - A - 2,501,375 describes the recovery of mercury by passing an aqueous sludge through tin or zinc pellets in a hollow body.

All these non-electrolytic methods have the drawback that they rely on an exchange reaction that leads to substantial tin dissolution with consequent contamination of the outlet stream, especially at low pH. Also, low mercury contamination levels cannot be reached especially when organic or low solubility inorganic compounds are treated. Further, the methods are mainly for caustic solutions in which the materials precipitate, but such precipitation leads to blockage of the filters used and the filtered product is itself a non disposable contaminant.

DE - A - 3'709'359 discloses the electrolytic recovery of metallic mercury from a bath containing $Hg_2Cl_2$ in suspension by cathodic reduction using a cathode of iron, silver, nickel, copper, cadmium, aluminium, zinc, tin or their alloys in which the steady-state conditions are such that metallic mercury collects on and drips off the cathode. The presence of metallic mercury on the cathode surface means that non-negligeable amounts of colloidal mercury necessarily remain dissolved in the solution, which prevents removal of mercury below a limiting value.

UK - A - 1 312 681 describes the recovery of mercury and other heavy metals using a porous cathode, usually of graphite, with current reversal to deposit the heavy metal from a dilute stream and re dissolve it in a more concentrated solution, the metal being then recovered form this concentrated solution.

EP - B - 0'071'443 describes an electrolytic cell using reticulate cathodes made of metallic foams and open structure coated titanium anodes wherein a plurality of spaced anodes and cathodes are arranged as a membrane-free and diaphragm-free cell through which the waste waters flow. The metal removing efficiency of the cell is good and the final concentrations of heavy metals contained in the waste waters can be reduced from a few grams per liter to a few ppm or less.

Other designs of electrolytic cells for metal recovery from waste streams are also known, including cells with packed or fluidized bed electrodes and cells with a roll configuration.

Generally speaking, it can be said that for many highly contaminated solutions (containing much more than ten ppm of mercury), using known electrolytic methods and cells the mercury level can be reduced to just a few ppm without great difficulty.

However, in practice, the known electrolytic cells have not proven to be effective in applications involving the removal of mercury to trace values, e.g. to below about 1 ppm (1000 ppb). For this, methods involving the use of ion-exchange resins are used despite the fact that such resins and their regeneration are expensive. These resins are not effective against organic mercury-laden effluents but nevertheless have been used to reduce the mercury content of such streams from 1-2 ppm to about 200 ppb.

SUMMARY OF THE INVENTION

The invention, as set out in the claims, provides an electrolytic process for purifying waste streams contaminated with mercury which process is cheaper and more reliable than currently used ion-exchange processes and at the same time avoids the drawbacks and limitations of the other known non-electrolytic processes and of the known electrolytic processes. The process according to the invention can, if required, be used to reduce mercury contamination to well below 500 ppb, for example 200 ppb or less for the most problematic acidic waste streams from the flue gases of organic processes containing mercury in organic form, or to below 50 ppb for less problematic waste streams.

The invention concerns a method of purifying a waste stream contaminated with mercury by flowing the stream through at least one electrolytic cell provided with an anode and a cathode having a surface made of tin, copper, silver or alloys thereof and optionally comprising gold, zinc, iron, gallium, aluminium and sodium as alloying element(s). Tin and tin alloys are preferred.

The method according to the invention constitutes a form of cathodic filtration wherein the solution to be treated is passed cyclically and/or sequentially through at least one cell or cell module having microporous, high surface area cathode bodies through which the electrolyte can pass, with the solution sweeping the microporous surfaces. This passage or cycling may take place through a single cell or cell module when the solution does not contain complex organic compounds and where relatively small volumes of liquid are to be treated—for example waste waters from a dentist's installation.

For treating large volumes of solution, for example organic mercury-laden effluents, the liquid will be passed sequentially and cycled through several cells or grouped series of cells (cell modules), at least one subsequent cell or cell module having microporous, high surface area cathode bodies wherein the pore size of the cathode bodies is progressively smaller, i.e. as the solution gradually becomes purified. When using several cells or cell modules, the best mercury purification combined with low losses of tin has been obtained when the microporous cathode bodies of the first cells or cell modules are made of a tin alloy, for instance tin-copper or tin-zinc, and are followed by at least one cell or cell module having microporous or macroporous metallic tin cathode bodies. This last tin cathode body may even be an open mesh, e.g. in the configuration of a roll cell.

The cathode bodies are polarised at a voltage sufficient to cathodically protect them from any substantial dissolution in the waste stream, and to deposit mercury on the cathode bodies as an amalgam with the metal(s) of the cathode bodies, and possibly partly as metallic mercury adsorbed on the cathode surface.

The waste stream passes through the cell(s), sweeping the microporous cathode surfaces, at a sufficiently high speed to keep the surface clean by hindering or preventing substantial deposits of unwanted materials, such as precipitates of insulating material that are always present in flue gas washing processes. It is also possible to vary the flow rate to remove loose deposits. This speed of the waste stream also provides a good distribution of concentration gradients at the electrode/electrolyte interface. Tests have shown that speeds in the range 0.5 to 3 m/s are satisfactory.

Unwanted deposits of insulating materials e.g. from flue gas washing processes may nevertheless build up, despite the permanent cleaning action of the stream. Such deposits can be removed from the microporous surfaces of the cathode bodies, without removal of the amalgam, for example by flushing periodically (e.g. every few days or every week) or when needed, using a cleaning fluid such as water, an aqueous cleaning liquid or compressed air flowing counter to the flow of the stream during normal operation. Another expedient for preventing and removing such unwanted deposits is to fit a removeable filter adjacent the microporous cathode surface. For example this could be a filter tube fitted between a cylindrical cathode and anode. When the filter becomes clogged, it can be pulled out and replaced. If such a filter is used, the stream will still be flowed at high speed to sweep the filter and the microporous cathode surface.

Very advantageously, the flow of the waste stream through the cathode bodies is periodically stopped for rest periods during which cathodically deposited mercury is allowed to amalgamate with the metal(s) of the cathode body. Typically, the rest period follows after a counter-current flow of liquid to remove unwanted deposits, the cathode bodies remaining in the cleaning liquid during the rest period.

These rest periods may for instance be several hours a day, permitting a cyclic daily routine. This is very appropriate for installations that can be shut down overnight. In installations which must be operated continuously, several cathode bodies or cell modules can be provided in parallel, wherein at least one selected cathode body or cell module is periodically at rest while the others are operating.

After unwanted deposits have been removed from the cathode bodies, the surface of the cathode bodies may be activated by contacting the surfaces with a solution containing ions of at least one metal present in the cathode surfaces, during a rest period or during normal operation. For example, when the cathode surface contains tin, the activating solution contains tin ions. This activation of the cathode surfaces will normally take place less frequently than the periodic cleaning/flushing, typically not more than once per week. Activation can take place periodically, e.g. every 10 days or 14 days, or whenever necessary, depending on the process conditions.

This activation relies on a cementation reaction between the metal in solution and the metals on the cathode surface.

The microporous cathode bodies are removed and replaced periodically (e.g. every several weeks) or when necessary for example when the level of metallic mercury in the stream issuing from the cell(s) indicates that there is a deposit of non-amalgamated or non-adsorbed metallic mercury on the cathode bodies, e.g. when metallic mercury begins to drop from the cathode.

It is easy to recover mercury from the used cathodes, by heat treatment in a closed loop system under a stream of nitrogen, without any risk of polluting the atmosphere with mercury, at the same time regenerating the cathodes for re-use. But if the cathodes cannot be regenerated, or if they have already been regenerated one or more times and can no longer be regenerated, they can be pyrolised, melted and re-used for manufacturing new cathodes.

A feature of the process according to the invention, especially when it is used to treat organic mercury-laden solutions, is that the mercury compounds are anodically oxidised and a large proportion of microscopic particles in the solution will be removed in the first electrolysis stage or stages. No effective way of filtering such microscopic particles had heretofore been found. The exact mechanism by which the aforesaid effect occurs is not understood fully, but it appears that when organic mercury complexes are treated, mercury-organic bonds are broken down by anodic oxidation and this then considerably enhances the efficiency of the cathodic deposition process. A similar effect also occurs, but usually to a lesser degree, with non-organic solutions. For this reason, the flow is advantageously arranged such that the anolyte and catholyte are not permanently separated, but so that the anolyte becomes mixed with the catholyte of the same cell or of the next cell in line.

The process produces excellent results for difficult-to-treat solutions where the pH of the waste stream entering and leaving the cells is between about 1 and about 7, typically from 1.5 to 3.5 in difficult organic mercury-laden solutions. But the process can also be used for alkaline solutions, e.g. the catholyte from chlor-alkali cells of the flowing mercury cathode type.

The microporous cathode bodies may be cylinders of sintered metal, wherein the porosity is defined by the metal particle size, typically from about 100 $\mu$m to about 1000 $\mu$m. Excellent results have been obtained for example using a series of three different porosities, the first from about 400 to 800 $\mu$m, the second from about 300 to 500 $\mu$m, and the third from about 100 to 300 $\mu$m. Instead of sintered bodies, these cathodes may also be made of microporous foam metal with corresponding porosities, made by metallising an organic foam then pyrolising the organic material. It is also possible to use metallic felts with a similar microporosity. Instead of being made into cylinders, the microporous material may be rolled, with a metal anode mesh suitably spaced therefrom, into a roll configuration. This roll configuration is particularly suitable for a final cell with a macroporous tin cathode.

In order to minimize clogging of the microporous cathodes, the electrolyte will flow along the cathode bodies to sweep their surfaces, e.g. an axial flow of 0.5 to 3 m/s along a cylindrical cathode. Preferably, the liquid to be treated will flow from outside the cathodes to inside, with the anodes being arranged outside the cathodes. Deposits produced by the aforesaid anodic oxidation will thus be on the outsides of the cathode cylinders and can easily be removed by the sweeping action of the waste stream and/or by cleaning periodically or when needed. With this configuration, the cleaning can take place by stopping or deviating the electrolyte flow and supplying a counter-current of cleaning water under pressure that washes the deposits from the external surfaces of the cathodes. Such washing may take place every few days or whenever necessary.

The anodes are preferably open structures of highly expanded titanium mesh coated with an electrocatalytic coating, available under the trademark DSA. These structures can be made as cylinders which fit around cylindrical microporous cathodes, with a suitable plastic spacer in between, or can be rolled together with a microporous cathode sheet, again with one or more spacers in between.

Most usually, the treated waste stream is repeatedly cycled in a loop through each cell or each group of cells. For instance the stream is repeatedly cycled through a first cell or cell module with cathodes of given microporosity until the mercury level is reduced to a given level, then the stream is sent to the next cell or cell module having cathodes with finer microporosity.

Cells making up a cell module may be arranged with their cylindrical microporous cathodes side-by-side with suitable ducting connecting one cell to the next, but in another arrangement the treated waste stream may be flowed sequentially through a series of aligned tubular microporous cathodes making up a cell module.

Another aspect of the invention is an installation for purifying waste streams contaminated with mercury, as set out in the claims.

A further general aspect of the invention is a method of purifying a waste solution contaminated with a heavy metal such as mercury which amalagamates with tin, copper or silver by cathodic filtration, which method comprises:

(a) passing the waste solution cyclically and/or sequentially through at least one cathodically polarised microporous, high surface area cathode body through which the electrolyte can pass, with the solution preferably sweeping the microporous surfaces;

(b) polarising the cathode body or bodies at a voltage sufficient to cathodically protect the body or bodies from any substantial dissolution in the waste solution and to deposit the heavy metal on the microporous surface as an amalgam with the metal(s) of the cathode bodies and possibly partly with the heavy metal adsorbed on the cathode surface;

(c) removing unwanted deposits from the microporous surfaces of the cathode body or bodies periodically or when necessary by flowing a cleaning fluid through the microporous bodies counter-current to the flow of said solution; and (d) allowing the cathode body or bodies to remain for a rest period without polarisation, possibly in contact with the cleaning fluid, before passing the waste solution again according to steps (a) and (b) with the body or bodies polarised.

In this method, advantageously during removal of the deposits and/or during a subsequent rest period, the surface of the microporous body or bodies is activated by contact with a solution containing small amounts of ions of at least one metal present in the cathode surface.

BRIEF DESCRIPTION OF DRAWINGS

The invention will be further described, by way of example, with reference to the accompanying drawings, in which.

DETAILED DESCRIPTION

Figure 1:
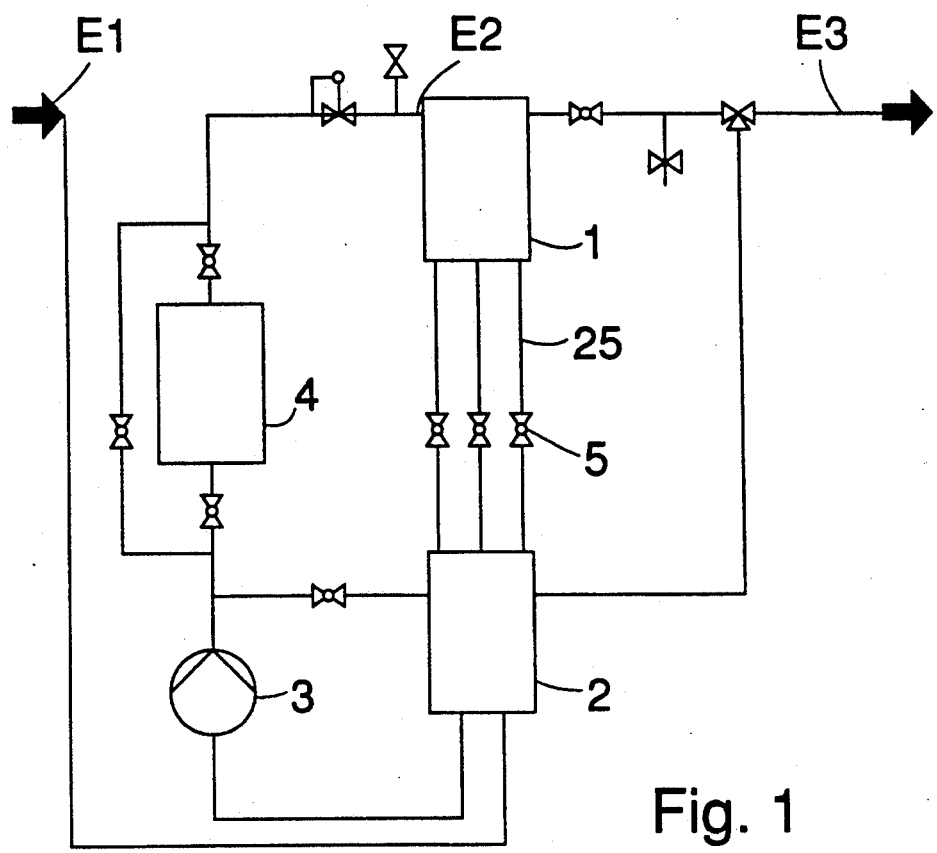
FIG. 1 is a diagram of part of an installation for carrying out the invention.

FIG. 1 shows the equipment associated with one cell module 1. The installation may consist of a single cell module 1 with associated equipment, as shown in FIG. 1, or several such modules with their associated equipment, connected to sequentially treat effluent once the mercury level has been reduced to a target level by the preceding module.

Each cell module 1 is connected to a reservoir 2, a pump 3 and a filter 4, with the associated piping and valves 5 arranged as shown.

Figure 2:
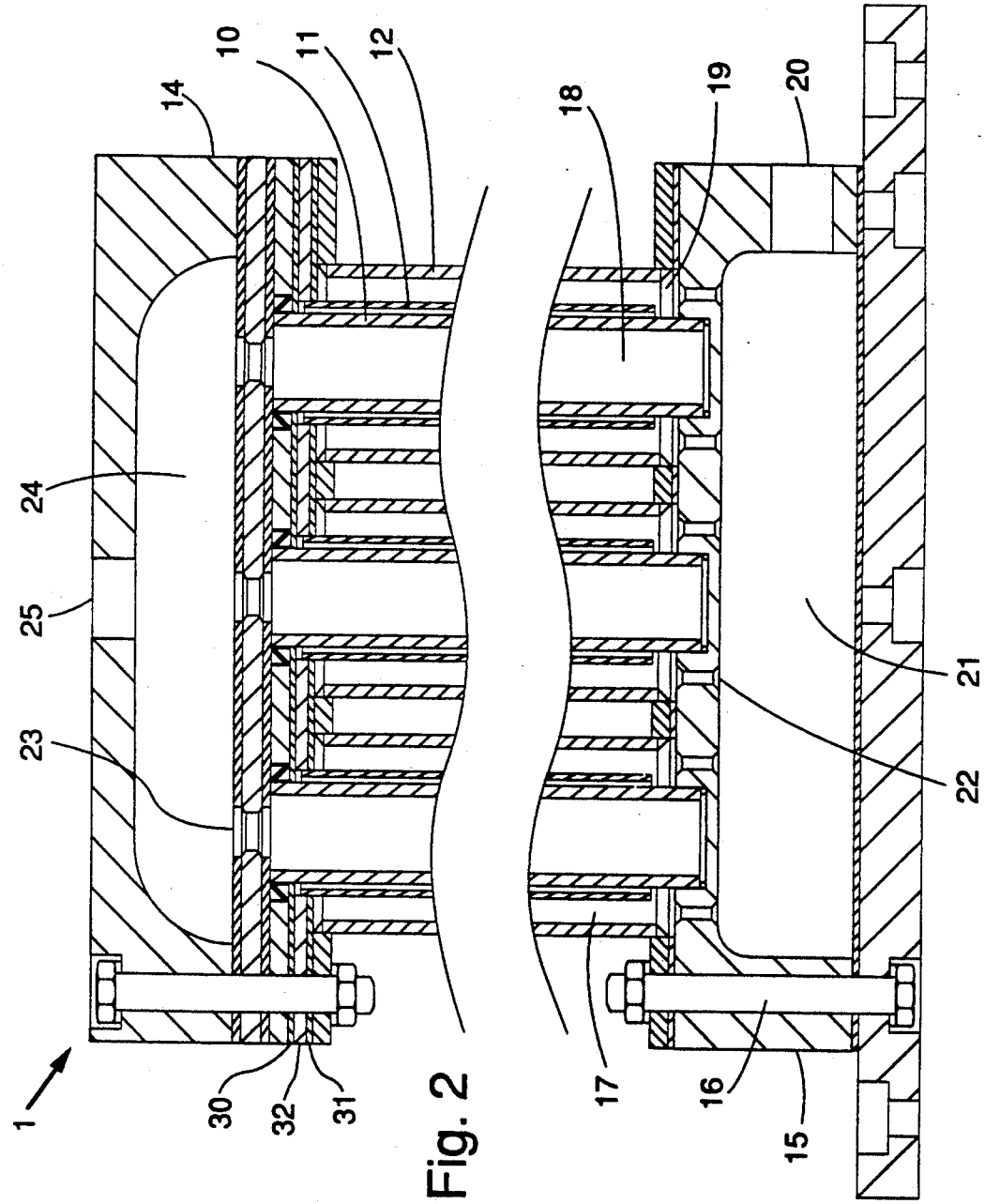
FIG. 2 is a cut-away cross-section through an electrolytic cell module of this installation.

As shown in FIG. 2, each cell module 1 comprises several cylindrical cathodes 10 each surrounded by a cylindrical anode 11 made of titanium mesh coated with an electrocatalytic coating, there being a spacer, not shown, between the cathode 10 and anode 11. Each cathode 10 and anode 11 is surrounded by a tubular cell wall 12 of inert material, such as PVC or polypropylene, to make up a cell. Each cell has an anolyte compartment 17 between the anode 11 and cell wall 12, and a catholyte compartment 18 inside the tubular cathode 10.

In the illustrated example, three of these cells are mounted side-by-side between a top 14 and bottom 15 assembled by bolts 16. It is also possible to enclose these cells in a housing made of PVC, polypropylene or other suitable inert materials, which housing has an appropriate shape to receive the given number of cells in the chosen configuration, for example it may be generally rectangular or circular. The cathodes 10, anodes 11 and walls 12 are fitted in suitable recesses in the top 14 and bottom 15 with fluid tightness provided by gaskets 19.

The overall effluent flow is shown in FIG. 1: effluent to be treated enters at E1 and after being pumped through reservoir 2 and filter 4 by pump 3, enters the cell module 1 at E2 and exits after treatment via E3.

The cell module 1 has an effluent inlet 20 leading via a chamber 21 and openings 22 to the anolyte compartments 17 of the three cells, and an effluent outlet 25 communicating with the catholyte compartments 18 of the three cells via an opening 23 passing into a chamber 24.

The cathodes 10 are cylinders of microporous sintered tin-copper or tin-zinc alloys of selected microporosity, depending on the mercury concentration in the solution to be treated by the cell module. With the described arrangement where the cell module 1 has three cells in parallel, each cell module may have identical cathodes, but with the microporosity/materials of the cathodes varying from one cell module to another. Alternatively, for example in the case when the cells in a cell module are connected in series, the different cathodes in a cell module can have different microporosities and may be made of different materials. As discussed previously, the microporosity will become finer as the solution becomes purer, and the cathodes of finest microporosity may have an increased tin content. Electrical connection to the cathodes 10 and anodes 11 is provided by plates 30 and 31 or copper and titanium, respectively, separated by an insulating layer 32.

In a specific example of the installation, three cell modules 1 with the associated equipment as shown in FIG. 1 are connected in series, the effluent outlet 25 of the first module leading to the inlet 20 of the next module, and so on. Each cell module 1 has three identical cylindrical cathodes 10 made of sintered tin-copper bronze. The microporosity of the cathodes in the respective modules is 600 $\mu$m, 400 $\mu$m, and 200 $\mu$m, calculated as the size of the sintered metal particles. Each cathode measures about 250 mm long with an internal diameter of 27 mmm and an external diameter of 33 mm, but other sizes are possible, for example a length from 100 to 500 mm and wall thickness from about 3 to 5 mm. The reservoir 2 of each cell module has a capacity of 150-250 liters and the pumps 3 are centrifugal pumps able to pump about 30 m$^3$/h. The filter 4 has a cartridge of polypropylene filter fabric measuring about 400 mm long by 200 mm diameter and having approx. 1-10 $\mu$m mesh size. As shown, the filter 4 has a by-pass circuit allowing easy exchange of the filter when it becomes clogged. In addition to the filter 4 of each module, the installation may have an extra filter at the inlet of the first module.

Such an installation is designed to purify an acidic waste stream (pH about 1.2 to 3.5, for example) containing 5-6 ppm of mercury including 1-2 ppm of mercury in organic form, to a final concentration of less than 0.1 ppm (100 ppb) including less than 50 ppb of mercury in organic form. The first module reduces the mercury concentration to 1.5 ppm total, 200 ppb organic, the second module reduces the concentration to 500 ppb total, 50 ppb organic, and the third module reduces the concentration to the final values.

In operation, the waste stream is pumped to sweep the microporous cathode surfaces at a speed of 0.5 to 3 m/s, thereby keeping these surfaces clean for long service periods. Despite this, and despite filtering the waste stream in filters 4, microscopic particles in the anodically treated organic solution in compartment 17 may slowly deposit on the microporous cathode surfaces. Therefore, in order to maintain the efficiency of the cathodes 10, their microporous surfaces are cleaned periodically (e.g. every 2-3 days or every week, depending on the conditions) or when needed, by countercurrent flushing with cleaning water.

Flushing is achieved by opening the flushing valves 5, possibly after having diverted the waste stream at the inlet 20, to allow flushing water to enter via 25 into the cathode compartments 18 and leave by via the anode compartments 17, openings 22, chamber 21 and 20. When the cells of a module are connected in parallel, the cathodes can be flushed individually if desired, using separate valves 5 for each cell as shown in FIG. 1. During flushing, it is convenient to switch off the electrolysis current.

In normal operation, the waste stream flows from inlet 20 into the anode compartments 17, through the microporous wall of cathode 10 wherein mercury is electrodeposited as an amalgam, into the cathode compartments 18, then via openings 23, chamber 24 and outlet 25 into the next module.

When flushing is initiated, flushing water under pressure enters the tops of the cathode compartments 18 and flows through the microporous walls of cathodes 10 from inside to outside, driving off unwanted particles of non-conducting material from the outer surfaces. Flushing water exiting the module 1 via 20 is delivered to reservoir 2 and either recycled to the same cell module 1 via filter 4 or delivered to the next module via a bypass line. For cell modules with the cells connected in series, it is possible to arrange that during flushing the outside walls of the cathodes 10 continue to be swept by the stream of flushing water or by the waste stream.

The cathodes 10 are removed and replaced periodically, for example every 4-6 weeks or when necessary. For this, the concentration of mercury in the stream at the outlet 25 of each module is measured using conventional detectors that measure the total mercury content and the level of metallic and ionic mercury. The content of organic mercury compounds can be calculated from these measurements. If the level of metallic mercury exceeds a threshold value of for example 100-200 ppb, this indicates that the mercury deposited on the cathodes initially as an amalgam or in adsorbed form, is instead metallic mercury, necessitating reactivation of or a change of the cathodes 10. Also, if the total mercury level drops but then remains stable at a given value above the target value for the cell module, this provides an indication of the need to change the cathodes 10.

Changing of the cathodes is achieved quite easily by disconnecting the electrical supply, cutting off the supply of liquid, releasing bolts 16 to open the module housing, removing the top 14 and removing and replacing the cathodes 10.

The invention will be further illustrated by examples of tests with various microporous cathodes.

EXAMPLE 1

Electrolyte was cycled through a cell having a microporous cylindrical cathode and a coated titanium anode, generally as described above and shown in the drawings, except that the cell module contained a single anode/cathode assembly. The cylindrical cathode was a sintered 90/10 copper tin alloy with a microporosity of 150 $\mu$m, an internal diameter of 27 mm, a wall thickness of 3 mm and a length of 250 mm. The electrolyte was 100 liters of an organic mercury-containing effluent from an industrial process with a pH of 1.1. The initial total mercury content was 2200 ppb. The anodic current density was 1.25 A/m$^2$ and the flow rate across the cathodic wall was about 0.4 m$^3$/h at a temperature of 26° C. After 2 hours, which corresponds to about 8 cycles, the total mercury content had dropped to about 500 ppb and after 10 hours was about 250 ppb. By continuing the test to 40 hours, the mercury content was reduced to about 60 ppb.

EXAMPLE 2

A similar test was carried out with a 400 mm length cathode. The initial total mercury content was about 4500 ppb with a pH of about 1.6. The anodic current and temperature were as in Example 1. The flow rate was increased to about 0.8 m$^3$/h. After 2 hours, the mercury content had dropped to about 650 ppb and after 10 hours to about 200 ppb. By continuing the test to 48 hours, the mercury content was reduced below 120 ppb. All remaining mercury was probably as insoluble organic compounds. Ionic and metallic mercury could not be detected.

EXAMPLE 3

A test similar to Example 1 was made but with an electrolyte containing only ionic Hg(II) at an initial concentration of about 1000 ppb. The pH was 2.5, the flow rate 0.45 m³/h and the temperature was maintained at 25° C. After 2 hours, the mercury level dropped to about 200 ppb and after 5 hours was less than 50 ppb.

EXAMPLE 4

A test was made using a cylindrical cathode of a sintered 90/10 copper tin alloy with a porosity of 400 μm, an internal diameter of 27 mm, a wall thickness of about 3 mm and a length of 250 mm. 100 liters of industrial organic mercury-containing effluent with a pH of 2.2 was cycled through the cathode at a flow rate of 4 m³/h. The initial total mercury concentration was about 6600 ppb. After 5 hours, its level dropped to about 600 ppb. The resulting electrolyte was then passed through the cell described in Example 1. The mercury level dropped at 200 ppb after 2 hours cycling at a flow rate of 2 m³/h and a temperature of 25° C.

EXAMPLE 5

Following a 2 hours treatment as in Example 3, electrolyte with a residual mercury content of 200 ppb was further treated in a roll cell having a metallic tin mesh cathode with a mesh size of 0.5 mm and a titanium mesh anode separated by a polyethylene sheet. The cell had a nominal outer diameter of 80 mm and a length of about 500 mm. After 2 hours cycling at a flow rate of 2 m³/h, the mercury concentration had dropped to below 5 ppb.

EXAMPLE 6

Electrolyte was circulated through three cell modules each having three cells in parallel, as shown in FIG. 2. The cathodes 10 were sintered tubes of 90/10 copper/tin bronze, 240 mm long and 27 mm inner diameter. The cathode porosities in the successive module were 600 μm, 400 μm and 200 μm. The mean voltage was 2.4 V and the average cathodic current density 1.57 A/m².

The electrolyte, 150 liter of a highly corrosive industrial effluent pH 1.8, was sequentially recycled through each module with a flow of 4 m³/hour, with a passage time of 40 minutes in each module.

Figure 3:
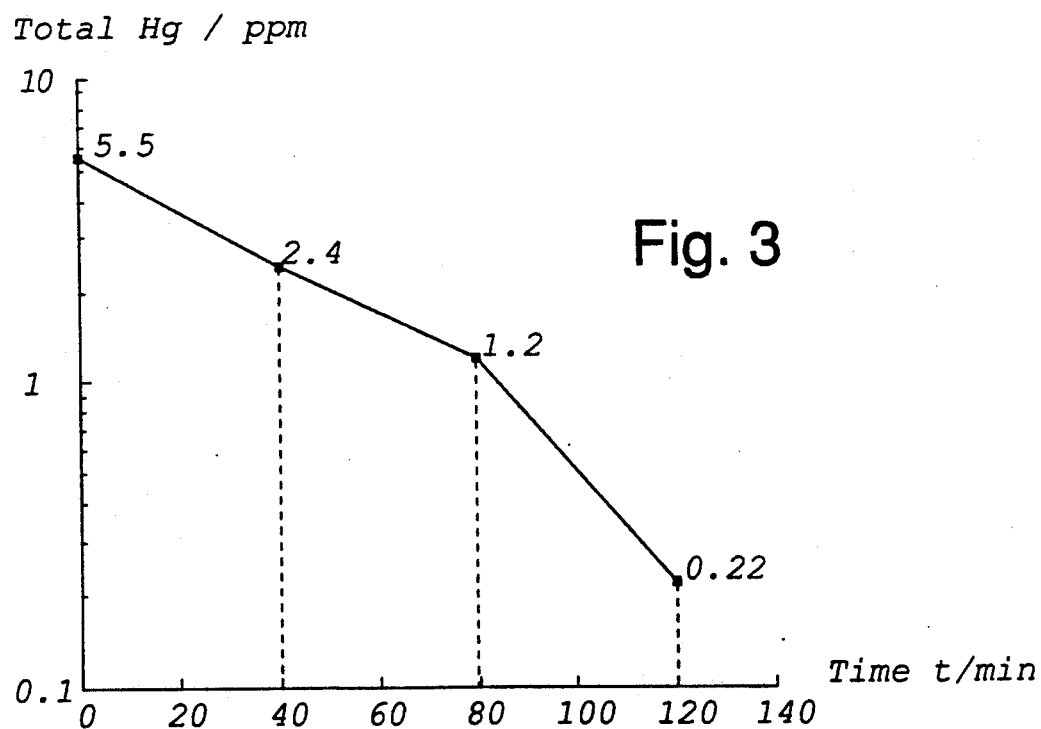
FIG. 3 is a graph showing the reduction of mercury content with time in a three-module installation.

After a 120 minutes treatment, the result shown in Table I and FIG. 3 was obtained. It can seem that a very low final concentration of mercury was obtained in a relatively short time. The reduction of the total mercury content was 96% which corresponded to a 56% reduction in the first module, a 50% reduction in the second module and an 82% reduction in the third module.

TABLE I

| ppm | Hg TOTAL | Hg ORGANIC | Hg IONIC | Hg METALLIC |
|---|---|---|---|---|
| INITIAL CONCENTRATION | 5.5 | 3.1 | 1.2 | 1.2 |
| FINAL CONCENTRATION | 0.22 | 0.12 | 0.01 | 0.09 |

EXAMPLE 7

A similar test was performed with an effluent having a lower mercury content. The applied voltage was 2.5 V and the cathodic current density was 2.2 A/m³. The recirculation time for each module was reduced to 25 minutes. After 75 minutes, the results shown in Table II were obtained. The reduction of the total mercury content was 92%: 37% in the first module, 62% in the second module and 67% in the third module.

TABLE II

| ppm | Hg TOTAL | Hg ORGANIC | Hg IONIC | Hg METALLIC |
|---|---|---|---|---|
| INITIAL CONCENTRATION | 0.51 | 0.23 | 0.02 | 0.26 |
| FINAL CONCENTRATION | 0.04 | 0.02 | 0.01 | 0.01 |

EXAMPLE 8

The test of Example 6 was continued until the first and second modules reached saturation as indicated by the fact that the total mercury content was reduced by 0% in the first module, 4% in the second module and 78% in the third module.

2 ppm of tin in the form of tin chloride was added to the effluent. During the next cycle, the mercury content was reduced by 50% in the first module, 46% in the second module and 74% in the third module. This illustrates the efficiency of tin to rejuvenate the cathodes.

EXAMPLE 9

Several volumes of effluent, 480 liter in all, were treated during the same day as in Example 6. When the last volume was circulated, the mercury concentration dropped from 2.90 ppm to 1.5 ppm, which represented an 86% reduction.

At the end of the day, the installation was rinsed with water and allowed to rest overnight.

After this rinsing/rest period, when the first 120 liter volume was treated the next day in the same conditions, the mercury content dropped from 2.20 ppm to 0.14 ppm, which represented an efficiency of 94%.

By operating with such periodic rinsing followed by a rest period, for example each day, combined with cathode rejuvenation by adding tin, during operation or during a rest period, at longer intervals of a week or more, a high efficiency of the mercury removal can be maintained.

I claim:

1. A method of purifying a waste stream solution contaminated with mercury by flowing the stream through at least one electrolytic cell provided with an anode and a cathode having a surface made of tin, copper, silver or alloys thereof including alloys with gold, zinc, iron, gallium, aluminum and sodium as alloying element(s), which method comprises:
   (a) introducing the solution into at least one cell having a cylindrical microporous, high surface area cathode body of sintered metal or foam metal through which a solution can pass;
   (b) passing the solution through the body of the cylindrical microporous cathode of said cell;
   (c) sweeping the cathode body microporous surfaces with solution to reduce or prevent unwanted deposits;
   (d) passing solution through unseparated anolyte and catholyte compartments of said cell so that the anolyte from one cell passes into the catholyte compartment of the same cell or of another cell; and (e) removing deposits from the microporous surfaces of the cathode body by flowing a cleaning fluid through the microporous body counter-current to the flow of said solution.

2. A method of purifying a waste solution contaminated with a heavy metal such as mercury which amalgamates with tin, copper or silver by cathodic filtration, said method comprising:
   (a) passing the waste solution through the body of at least one cathodically polarised, cylindrical and microporous, high surface area cathode of sintered metal or foam metal through which the solution can pass, including sweeping solution on the microporous surfaces of said cathode body;
   (b) polarising the cathode body at a voltage sufficient to cathodically protect the body from any substantial dissolution in the waste solution and to deposit the heavy metal on the microporous surface as an amalgam with the metal(s) of the cathode body alone or with the heavy metal adsorbed on the cathode surface;
   (c) removing unwanted deposits from the microporous surfaces of the cathode body by flowing a cleaning fluid through the microporous body counter-current to the flow of said solution; and
   (d) allowing the cathode body to remain for a rest period without polarisation, in or out of contact with the cleaning fluid, before passing the waste solution again according to steps (a) and (b) with the body polarised.

3. The method according to claim 2, wherein the solution is passed sequentially through several cells or grouped series of cells (cell modules), at least one subsequent cell or cell module having microporous, high surface area cathode bodies wherein the pore size of the cathode bodies is smaller than that of the previous cell or cell module.

4. The method according to claim 3, wherein the treated waste solution is repeatedly cycled in a loop through each cell or each cell module.

5. The method according to claim 2, where the pH of the waste solution entering and leaving the cell(s) is between about 1 and about 7.

6. The method according to claim 5, wherein the treated waste solution contains organic mercury complexes.

7. The method according to claim 2, wherein the treated waste solution is flowed sequentially through a series of aligned tubular microporous cathodes.

8. The method according to claim 2, wherein the cell has anolyte and catholyte compartments, the treated solution passing through the anolyte and catholyte compartments so that the anolyte from one cell passes into catholyte of the same cell or of another cell.

9. The method according to claim 2, wherein unwanted deposits are removed from the microporous surfaces by counter-flow flushing with water or an aqueous cleaning liquid.

10. The method according to claim 2, wherein the cathode bodies are removed when the total level of mercury in the waste stream issuing from the cell(s) reaches a stationary value above a target value.

11. The method according to claim 2, wherein the waste solution is filtered before passing into the cell(s).

12. The method according to claim 2, which is followed by recovering mercury from cathode bodies that have been removed from a cell after use, by heat treatment of the cathode bodies in a closed loop system under a stream of inert gas.

13. The method of claim 2, wherein during a removal step (c), with or without a subsequent rest period of step (d) the surface of the microporous body is activated by contact with a solution containing ions of at least one metal present in said surface.

14. The method of claim 13, wherein cathodically deposited mercury amalgamates with the metal(s) of the cathode body during rest periods.

15. The method of claim 14, wherein the rest period follows after a counter-current flow of liquid to removed unwanted deposits, the cathode bodies remaining in the cleaning liquid during the rest period.

16. The method of claim 14, wherein the rest period is several hours per day.

17. The method of claim 14 which is operated continuously with several cathode bodies or cell modules in parallel, wherein at least one selected cathode body or cell module is periodically at rest while the others are operating.

18. The method of claim 14, wherein after unwanted deposits have been removed from the cathode bodies, the surface of the cathode bodies may be activated by contacting the surfaces with a solution containing ions of at least one metal present in the cathode surfaces, during a rest period or during normal operation.

19. The method of claim 18, wherein the cathode surface contains tin and the activating solution contains tin ions.

20. The method of claim 18, wherein the cathode surfaces are activated not more than once per week, periodically or when necessary.

21. An installation for purifying a waste stream solution contaminated with mercury, said installation comprising:
   at least one electrolytic cell provided with an anode and a cathode in an unseparated cell, said cathode having a surface made of tin, copper, silver or alloys thereof, including alloys with gold, zinc, iron, gallium, aluminum and sodium;
   at least one cathode in said cell having a hollow, cylindrical microporous, high surface area cathode body of sintered metal or foam metal, through which microporous cylindrical body the solution as electrolyte can pass,
   means for passing the solution through at least one cell with the solution passing through said cell;
   means for supplying an electrolysis current to polarize said cathode body at a voltage sufficient to cathodically protect the cathode body from any substantial dissolution in the waste stream solution and to deposit mercury on the cathode body as an amalgam with the metal(s) of the cathode body alone or with metallic mercury adsorbed on the cathode surface; and
   means for removing unwanted deposits from the microporous surfaces of the cathode body by flowing a cleaning fluid through the microporous body countercurrent to flow of the solution during normal operation, the cathode body being removable and replaceable.

22. The installation according to claim 21, wherein the microporous cathode body is made of a tin alloy, with there being at least one further cell having at least one microporous or macroporous cathode made of metallic tin.

23. The installation according to claim 21, wherein the microporous cathode is a cylinder of sintered metal or foam metal having a porosity corresponding to a metal particle size from about 100 μm to about 1000 μm.

24. The installation according to claim 21, comprising several cells or grouped series of cells (cell modules) for sequential passage of the waste stream solution, at least one subsequent cell or cell module having microporous, high surface area cathode bodies wherein the pore size of the cathode bodies is smaller than that in the previous from one cell or cell module.

25. The installation according to claim 21, where microporous cathode bodies of a cell are made of a tin alloy, including tin-copper or tin-zinc, and are followed by at least one further cell having at least one microporous or macroporous cathode body made of metallic tin.

26. The installation according to claim 21, wherein the microporous cathodes are cylinders of sintered metal or foam metal having a porosity corresponding to a metal particle size from about 100 μm to about 1000 μm.

27. The installation according to claim 21, comprising means for repeatedly cycling the treated waste stream solution in a loop through each cell or each cell module.

28. The installation according to claim 21, comprising a series of aligned tubular microporous cathodes through which the treated waste stream solution is flowed sequentially.

29. The installation according to claim 21, wherein the cell has anolyte and catholyte compartments, the treated solution passing through the anolyte and catholyte compartments so that the anolyte from one cell passes into the catholyte compartment of the same cell or of another cell.

30. The installation according to claim 21, wherein the means for removing unwanted deposits from the microporous surfaces are arranged to flush a cleaning liquid with a flow counter to the flow of the waste stream solution during normal operation, said means being arranged to allow the cleaned cathode bodies to remain in contact with the cleaning liquid for a pre-set or selectable rest period after or during counter-flow cleaning.

31. The installation of claim 30, which comprises several cathode bodies or cell modules in parallel, arranged for at least one cathode body or cell module to be periodically at rest while the others are operating.

32. The installation according to claim 21, comprising a filter for filtering the waste stream solution before it passes into the cell(s).

33. The installation according to claim 21, further comprising means for recovering mercury from cathode bodies that have been removed from a cell after use, including an oven for heat treatment of the cathode bodies in a closed loop system under a stream of inert gas.

* * * * *